Dec. 20, 1949

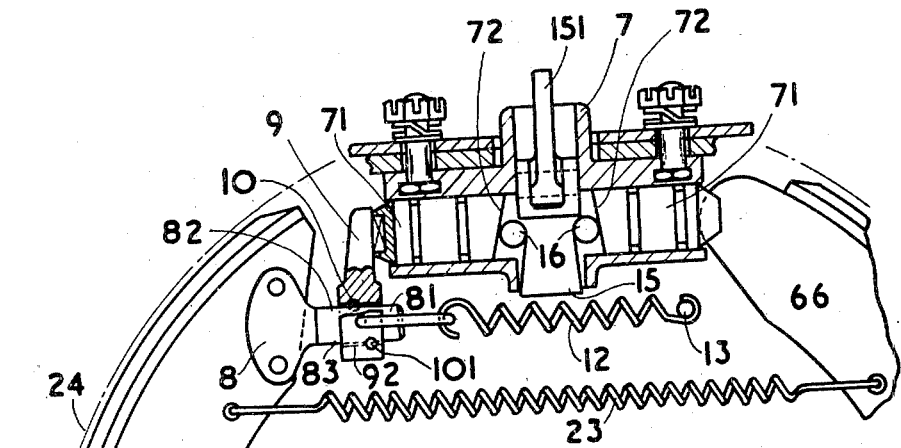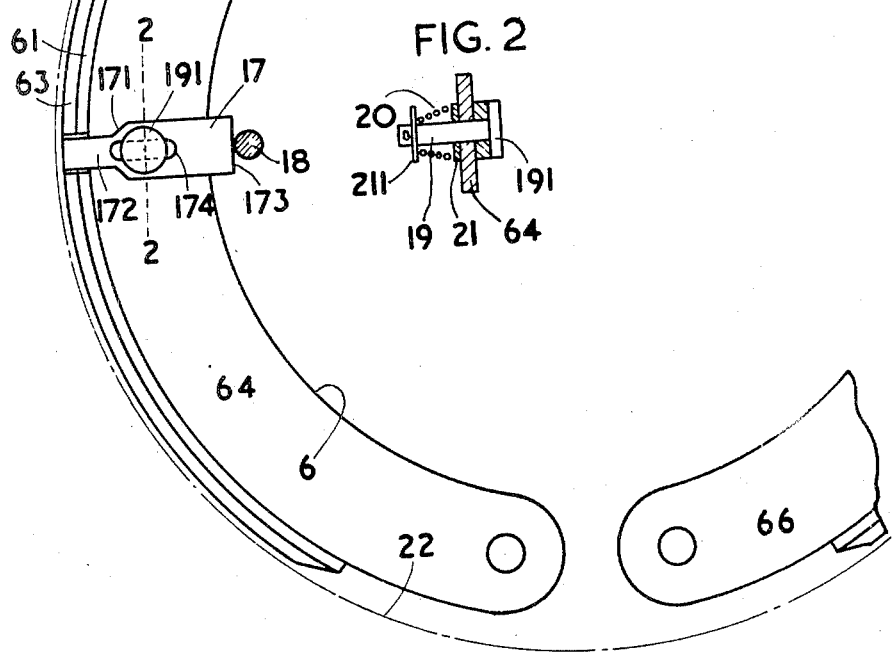

J. H. PRATT ET AL 2,491,830

CLUTCH DEVICE

Filed May 20, 1948

James Henry Pratt & Gilbert Edgar Mackey
By Kenway, Jenney, Witter & Hildreth
Attys.

Patented Dec. 20, 1949

2,491,830

UNITED STATES PATENT OFFICE 2,491,830

CLUTCH DEVICE

James Henry Pratt, Wythall, and Gilbert Edgar Manley, Norton Curlieu, England

Application May 20, 1948, Serial No. 28,126
In Great Britain June 4, 1947

5 Claims. (Cl. 74—160)

1

This invention has reference to improvements relating to clutch devices and is concerned particularly with clutch devices of the kind comprising a projecting member usually in the form of a rod which is associated with an eye or slot provided in a complementary member in such a manner that the projecting member can slide relatively to the eye or slot when the projecting member is in axial alignment with the axis of the eye or slot and such that movement between the projecting member and the eye or slot is prevented, when canting occurs, due to binding pressure between the wall of the eye or slot and the projecting member.

In clutch devices of the aforesaid kind the projecting member and eye are usually of a cylindrical formation with the consequence that when binding occurs the binding force is exerted substantially at a point with the result that slip, and undue wear of the co-acting members due to "digging in," may obtain and the present invention has for its object to minimise slip and wear in clutch devices of the kind aforesaid.

According to the invention an improved clutch device of the kind hereinbefore referred to is characterised in that the projecting member is made with flattened bearing surfaces and in that the eye or slot is provided with oppositely disposed self-alignable members having flattened bearing surfaces adapted to engage in surface contact with the complementary bearing surfaces of the projecting member when canting obtains for producing the requisite locking of the projecting member and of the complementary member associated with the eye or slot.

An embodiment of the invention will now be described with particular reference to the accompanying drawings which illustrate the invention as applied to a means for preventing the development of lost motion between the brake shoes and the expander mechanism in a two shoe internal expanding brake mechanism for vehicles utilising a "Girling" expander in which a feeler device is provided for automatically maintaining a substantially constant predetermined running clearance between the said shoes and the brake drum as is described in the specification of our pending United States patent application Serial Number 758,574 filed July 2, 1947.

In the drawings:

Figure 1 is a front view partly in elevation and partly in section of a brake as aforesaid equipped with a clutch device in accordance with the invention the brake being shown somewhat diagrammatically.

2

Figure 2 is a fragmentary view partly in section illustrating the method of connecting to the relevant brake shoe the feeler device employed in Figure 1 for ensuring automatically the maintenance of a predetermined running clearance between the brake shoes and the brake drum, the section being taken on the plane indicated by the line 2—2 in Figure 1.

Like numerals of reference indicate similar parts in the several views.

Figure 3:
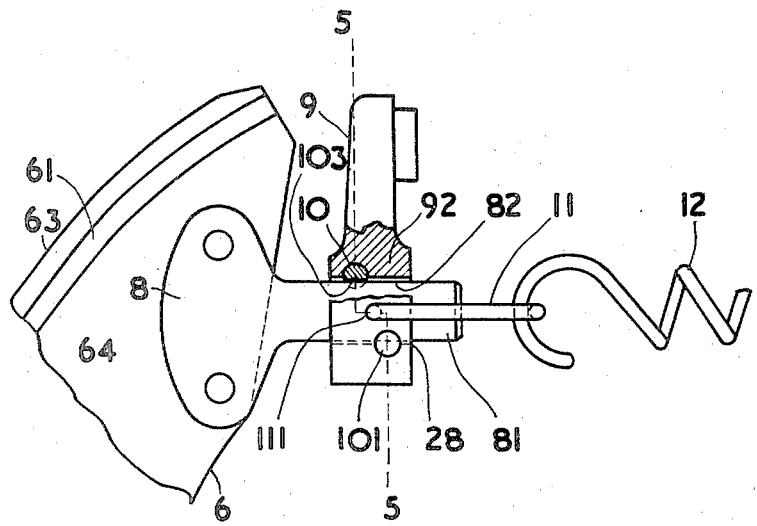
Figure 3 is a fragmentary view partly in section and on an enlarged scale of the clutch device employed in the construction illustrated in Figure 1.
Figure 4:
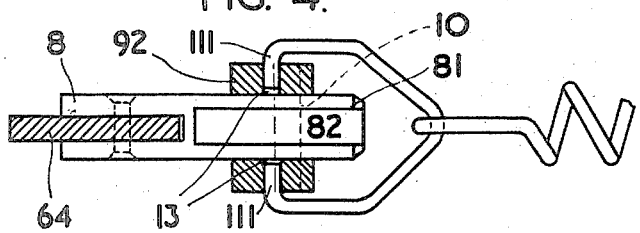
Figure 4 is a plan of Figure 3 partly broken away and sectioned for the sake of clearness and Figure 5 is a sectional view taken on the plane indicated by the line 5—5 in Figure 3.
Figure 5:
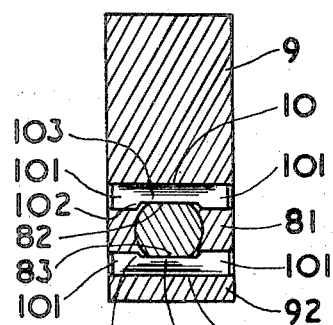

According to the said illustrated embodiment of the invention the leading brake shoe 6 has riveted thereto at a position adjacent to the expander mechanism denoted generally by the reference numeral 7 a bracket 8 provided with a short length of inwardly projecting rod 81 of a cylindrical shape in cross section with the outer portion flattened on the top and bottom as at 82, 83, see particularly Figures 3 and 5.

Adapted to be passed over this length of rod 81 is the eyed portion 92 formed at the inwardly directed end of an arm 9 the outer end of which is adapted to abut the presented face of the respective plunger 71 of the expander mechanism 7. The eye 92 is of greater depth than the eye in the case of the construction described in our prior application Serial Number 758,574 as aforesaid and turnably mounted within bearings in the arm adjacent to the eye 92 are the cylindrical ends 101 of two oppositely disposed pins 10 which are arranged in staggered relationship, see especially Figure 3. Each pin 10 is provided with a slotted portion 102 having a flat bearing surface 103 and these flat bearing surfaces 103 are presented inwardly and are spaced apart at a distance slightly greater than the depth of the length of rod 81 so that the rod 81 can slide between the flat surfaces 103 of the pins when the rod 81 is in axial alignment with the eye 92 and so that the pins 10 can turn to enable the flat surfaces 103 of the pins to align themselves automatically with and to exert surface pressure on the complementary flat surfaces 82, 83 of the rod 81 when the arm 9 is canted.

The arm 9 is engaged pivotally by the inwardly turned ends 111 of a bent wire hook 11 to which is anchored one end of a coil spring 12 the opposite end of which is anchored to a pin 13 secured to the back plate 14. The inwardly turned ends 111 of the hook 11 are engaged in holes 93 located substantially midway in the sides of the eyed portion of the arm 9 so that the said spring 12 exerts a pull on the arm 9 along a line which is substantially co-axial with the axis of the rod 81 and so as to tend to bring the axis of the eye 92 into coincidence with the axis of the rod 81 so that relative movement between these two parts is possible during the return movement of said parts.

The expander mechanism 7 which, as has been stated, is of the well known "Girling" type, incorporates a pair of plungers 71 the inner ends of which are provided with wedge faces 72 between which and the complementary faces of a frustoconical expander 15 are interposed freely displaceable rollers 16 and the braking effort is translated to the said expander 15 by a rod 151 which is connected to the brake operating means not shown.

Associated also with the leading brake shoe 6 is a feeler device generally designated by the reference numeral 17. This feeler device 17 incorporates a plunger 171 the outer end 172 whereof is of reduced depth and projects through holes formed in the table 61 of the brake shoe 6 and in the friction lining 63 fixed to the outer surface of the said table 61 whilst the other end 173 of the plunger 171 abuts a stop 18 carried by the back plate 14.

Intermediate its ends the plunger 171 is provided with an axially arranged elongated slot 174 through which is passed the shank 19 of a headed pin which also passes through a hole in the web 64 of the brake shoe 6.

A coil spring 20 is interposed between a friction washer 21 located on the shank 19 on the opposite side of the web 64 to the head 191 of the said pin and a washer 211 pinned to the said shank 19 adjacent to the outer end thereof. The spring 20 and friction washer 21 in conjunction with the head 191 serving to clamp the plunger 171 frictionally between the head 191 and the web 64 of the brake shoe 6.

The leading brake shoe 6 and the companion brake shoe 66 are interconnected by a "pull off" spring 23 and the degree of friction exerted on the web 64 by the spring 20 and friction washer 21 is arranged to be such that the pull normally exerted by the "pull off" spring 23 is insufficient to occasion displacement between the plunger 171 and the web 64 so that whenever braking is being performed the plunger 171 moves with the leading brake shoe 6 and returns with the brake shoe when braking pressure is relieved and arrests the return movement of the brake shoe 6 when the inner end of the plunger 171 abuts the stop 18.

The relationship between the plunger 171 and the stop 18 is determined initially to give a desired predetermined running clearance between the friction surface 63 and the brake drum 24 when the inner end 173 of the plunger 171 abuts the stop 18.

In the event of wear of the braking surface contact between the outer end 172 of the plunger 171 and the brake drum 24 occasions a displacement of the plunger 171 relatively to the brake shoe 6 against the resistance offered by the spring 20 and friction washer 21 so that compensation is effected automatically in the event of wear of the friction surfaces 63 in order to ensure that a substantially constant running clearance obtains at all times between the friction lining 63 of the leading brake shoe 6 and the brake drum 24 whenever braking is not being performed.

The operation of the invention is as follows:

The constant running clearance between the friction lining 63 of the leading brake shoe 6 and the brake drum 24 is maintained automatically by the relative displacement which takes place between the feeler device 17 and the brake shoe 6 in the manner described hereinbfore.

When the braking effort is applied, the plunger 71 of the expander mechanism 7 which transmits the braking effort to the leading brake shoe 6, bears on the outermost end of the eyed arm 9 and by virtue of the canting of the said arm 9 which has been occasioned on the return of the eyed arm 9 to the limit of its return movement after the previous braking operation and which canting is maintained during the operative movement of the plunger 71, causes the flat surfaces 103 and the pins 10 to bind firmly on the flat surfaces 82 and 83 of the rod 81 so that a positive braking effort is applied to the leading brake shoe 6.

When the braking pressure is relieved the "pull off" spring 23 returns the leading brake shoe 6 to the position determined by the inner end 173 of the plunger 171 abutting the stop 18.

In the event of compensation for wear of the friction lining 63 by displacement obtaining between the feeler device 17 and the leading brake shoe 6 as set forth hereinbefore there would normally be a space between the plunger 71 concerned and the adjacent end of the arm 9 but in accordance with this and the parent invention as the brake shoes 6 and 66 are returned to the full limit permitted by the abutment of the inner end 173 of the plunger 171 with the stop 18 slip takes place between the eyed arm 9 and the rod 81 so that the spring 12 connected to the said eyed arm 9 can draw the arm 9 inwardly into abutment with the relevant plunger 71 so that any lost motion which might develop as a consequence of a compensating adjustment as aforesaid is taken up automatically. Consequently on a succeeding braking operation the same degree of travel only is required from the brake actuating means to effect the requisite movement of the brake shoes 6 and 66 into contact with the brake drum 24.

It is found that the mutual self-alignment between the complementary flattened surfaces 103 of the pins 10 and the flattened surfaces 82, 83 of the rod 81 by ensuring that the whole of the flat bearing surfaces 103 of the pins 10 come into contact with the complementary flat surfaces 82, 83 of the rod when canting of the arm 9 takes place avoids the concentration of the loads at two points of contact only and thus minimises slip and also wear due to "digging in."

In a modification not illustrated the eye may be provided with part spherical recesses within which are located part spherical bearing pads having inwardly presented flat surfaces adapted to co-act with the flattened surfaces 82, 83 of the rod 81 in an analogous manner to the flattened surfaces 103 of the pins 10. In this modification it will be appreciated that the bearing pads are permitted a universal self-aligning movement.

It will be appreciated that the recessed flat surfaces 103 of the pins 10 in association with the centrally disposed rod 81 prevent endwise displacement of the pins 10 after the assembly of a clutch device.

Further it will be appreciated that the application of the invention to brake mechanism is given only by way of example as the invention may be applied with advantage to clutch devices of the kind concerned which are employed in other connections where a heavy binding force is required.

We claim:

1. A clutch device incorporating an eyed member adapted to be engaged by a part required to be operatively connected by the clutch device, a projecting member which is adapted to be engaged with the complementary part which is required to be operatively connected by the clutch device and which is adapted to slide within the eye when the axis of the eye is in axial alignment with the axis of the projecting member, means for causing said axial alignment to obtain on the return movement of the part aforesaid and for causing canting to obtain when the said part reaches the limit of its return movement, flattened bearing surfaces on the projecting member recess of an arcuate shape in cross section formed in the walls of the eye and oppositely disposed members of arcuate cross section self-alignably mounted within said recesses and having flattened bearing surfaces adapted to engage in surface contact with the complementary flattened bearing surfaces of the projecting member when canting obtains for producing the requisite locking of the eyed member and of the projecting member for effecting an operative connection of the parts associated with the said eyed member and projecting member.

2. A clutch device incorporating an eyed member adapted to be engaged by a part required to be operatively connected by the clutch device said part during an operative movement inducing a canting of the eyed member, a projecting member which is adapted to be operatively connected with the complementary part which is required to be operatively connected by the clutch device and which is adapted to slide within the eye when the axis of the eye is in axial alignment with the axis of the projecting member, spring means for causing said axial alignment to obtain on the return movement of the part aforesaid and for causing canting to obtain when the said part has attained the limit of its return movement, recesses of an arcuate shape in cross section formed in the walls of the eye and oppositely disposed members of arcuate cross section self-alignably mounted within said recess and having flattened bearing surfaces adapted to engage in surface contact with the complementary flattened bearing surfaces of the projecting member when canting obtains for producing the requisite locking of the eyed member and of the projecting member for effecting an operative connection of the parts associated with the said eyed member and projecting member.

3. A clutch device incorporating an eyed member adapted to be engaged by a part required to be operatively connected by the clutch device said part during an operative movement maintaining a canting of the eyed member, a projecting member which is adapted to be operatively connected with the complementary part which is required to be operatively connected by the clutch device and which is adapted to slide within the eye when the axis of the eye is in axial alignment with the axis of the projecting member, spring means for causing said axial alignment to obtain on the return movement of the part aforesaid and for causing canting to obtain when the said part has attained the limit of its return movement, recesses of an arcuate shape in cross section formed in the walls of the eye and oppositely disposed members of arcuate cross section self-alignably mounted within said recesses and having flattened bearing surfaces adapted to engage in self-alignable bearing contact with the complementary flattened bearing surfaces of the projecting member when canting obtains for producing the requisite locking of the eyed member and of the projecting member for effecting an operative connection of the parts associated with the said eyed member and projecting member.

4. A clutch device according to claim 1 in which the oppositely disposed self-alignable members are arranged also in a staggered relationship.

5. A clutch device according to claim 3 in which the self-alignable members are provided with cylindrical outer portions which are turnably mounted in bearings formed in the eyed member and in which the central portions of the said members are recessed and provided with flattened surfaces for co-operation with the flattened surfaces of the projecting member.

JAMES HENRY PRATT.
GILBERT EDGAR MANLEY.

REFERENCES CITED

The following references are of record in the file of this patent:

UNITED STATES PATENTS

| Number | Name | Date |
|---|---|---|
| 664,083 | Harthan | Dec. 18, 1900 |
| 784,938 | Hall | Mar. 24, 1905 |
| 979,703 | Ross | Dec. 27, 1910 |
| 1,227,941 | Sauvage | May 29, 1917 |